Oct. 3, 1961  E. E. PARKER ET AL  3,002,937
POLYESTER-URETHANE FOAM CONTAINING SYNTHETIC DETERGENT
AND METHOD OF PREPARING SAME
Filed Jan. 25, 1955
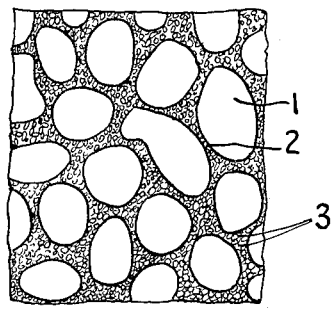
INVENTORS
KEITH H. COULTRAP and
EARL E. PARKER
BY
Oscar L. Spencer
ATTORNEY United States Patent Office 3,002,937
Patented Oct. 3, 1961

3,002,937
POLYESTER - URETHANE FOAM CONTAINING SYNTHETIC DETERGENT AND METHOD OF PREPARING SAME
Earl E. Parker, Allison Park, and Keith H. Coultrap, Oakmont, Pa., assignors to Pittsburgh Plate Glass Company, Allegheny County, Pa.
Filed Jan. 25, 1955, Ser. No. 484,022
4 Claims. (Cl. 260—2.5)

This invention relates to sponges and it has particular relation to sponges useful as scrubbing devices in various cleaning operations.

Foams of plastic materials having a highly cellulated structure, have heretofore been prepared from various plastic materials by the introduction of a gaseous medium as bubbles thereinto. One very good method of forming foams of the foregoing type comprises mixing a polyester resin such as may be obtained by esterification reaction of a mixture of a dihydric alcohol, e.g. diethylene glycol, and a dicarboxylic acid, such as adipic acid. Preferably the polyester should also contain a small amount of an alcohol of higher hydroxy content and designed to provide hydroxyls in the polyester chain and being represented by glycerol. The foregoing polyester in liquid or at least fusible state is mixed with a diisocyanate, such as tolylene diisocyanate, functioning as a cross-linking agent between the hydroxyls of contiguous molecules. A small amount of water or a water releasing agent is also incorporated into the mixture and this reacts with a portion of the diisocyanate to liberate carbon dioxide in situ, which becomes entrapped in the polyester.

To promote distribution of the polyester and the diisocyanate, it is customary to incorporate with the foamable mixture an emulsifying agent which is relatively soluble in the polyester-diisocyanate mixture. Like soap in water, it also assists in retaining bubbles in the liquid. This latter action is especially desirable during the early stages of the reaction. As the latter proceeds and the cross-linking reaction between the diisocyanate and the polyester molecules competing with the decomposition to form gases attains a sufficiently advanced stage, the resinifiable components set up to a degree sufficient inherently to retain the gases. Ultimately, the resinifiable components attain a solid, thermoset state providing a permanent foam of a polyurethane resin which may be relatively rigid or flexible dependent upon the alkyd resin used by the operator.

The foregoing cellulated bodies are usually of fine cell structure comprising a foam-like mass of minute bubbles of relatively uniform diameter with perhaps only an occasional bubble of large diameter occurring as an imperfection in the foam-like mass. It is deemed that in these conventional foams the bubble size is probably of an order of 0.05 inch or smaller. These foams comprising a mass of minute bubbles, are excellently adapted for certain applications as for example as filler materials in airplane propellers, as insulation materials, as cushions, and various other applications, but they are poorly adapted for use as synthetic sponges such as are employed by the housewife in washing dishes, furniture and for other applications. Likewise, they are not well adapted for use in washing automobiles and for other washing operations on a larger scale. This is true because in many instances they tend to form a smear when wet with water and rubbed over a soiled surface and do not adequately remove the soiling substance.

Cellular bodies having a capacity for use as cleaning sponges in lieu of natural sponges have also been produced by suitably foaming rubber or rubber-like materials, or cellulosic materials such as cellulose acetate, but these in general, have not been entirely satisfactory by reason of inferior cleaning properties, lack of tear-resistance, lack of durability, or for other reasons.

This invention is based upon the discovery that excellent synthetic sponges having good cleaning characteristics, good tear-resistance and exceptionally long durability can be prepared by foaming and concurrently cross-linking polyesters with a diisocyanate to form a polyurethane resin under such conditions that cells of two substantially different orders of size are formed and relatively uniformly distributed in the polyurethane plastic mass. Preferably one size of cells approximately corresponding to the fine cell structure of a conventional foam resin, are probably of an average diameter not much greater than 0.05 inch and corresponding to the cells in a lather. In addition to these minute cells many large cells are also formed which are of a diameter up to ½ inch or even an inch. They are distributed quite uniformly throughout the foamed mass. In such structure, the major portion of the total volume of the cellulated material is composed of these large cells having walls composed of the plastic material in solid, set state but being foamed to a mass of minute secondary bubbles. In general, these sponge structures have a high degree of intercommunication between the cells, especially between those of large diameter so that when the sponge is squeezed and released under water, large volumes of water will be taken up.

A suitable sponge embodying the dual cell sizes is approximately illustrated in the accompanying drawing. In the single figure of the latter, a small section of a sponge is illustrated and comprises large primary cells 1 relatively uniformly distributed throughout the entire mass and being sufficiently closely packed that they mutually influence the shape of each other. The walls 2 of these cells, as shown, comprise an enormous number of minute secondary bubbles 3 probably of a size seldom greater than approximately 0.05 inch. It will be observed that these bubbles are of such size that they seldom touch more than two of the larger bubbles.

The methods of obtaining the sponge of dual cell structures illustrated in the drawing in general depend upon incorporation into the liquid mixture from which the sponge is to be formed, an emulsifying agent or a plurality of emulsifying agents, at least one of which is but partially soluble in the polyester-diisocyanate mixture or at least is of low efficiency as an emulsifier in the system, and is a poor foaming agent for the latter.

A plurality of methods of attaining this reduced efficiency of emulsification with various agents have been developed. In some instances the emulsifying agent is inherently of low efficiency and can be used without any particular artifices in techniques. Others may require resort to such artifices, a number of which are hereinafter elaborated upon.

In those instances in which the emulsifying agent has some degree of solubility in the polyester-diisocyanate mixture, proper cellulation to provide a sponge can often be attained by increasing the proportion of the agent to such extent as to exceed the solubility limits thereof in said mixture.

Often emulsifying agents or wetting agents of high efficiency for the organic components and which when added to a foam-producing mixture produce foams rather than sponges, can be effectively modified by addition of other agents such as hydrocarbons (e.g. styrene), or salts of such metals as cobalt or nickel and organic acids, or additional emulsifying agents to provide a sponge forming mixture. Such systems often comprise efficient liquid emulsifiers such as the well known liquid emulsifier sold commercially as Emcol H-77 (Emulsol Corporation). In order to reduce the efficiency of these as emulsifiers there are added certain salts of organic acids and heavier metals and notably of the metals such as nickel or cobalt, which are conventionally employed as siccatives to promote the drying of oils such as linseed oils. Compounds useful in this system comprise:

Cobalt naphthenate,
   Cobalt linoleate.
   Cobalt oleate,
   Nickel naphthenate, or
   Manganese naphthenate.

A mixture of these two types of compounds incorporated with the polyester-diisocyanate mixture when the latter is foamed and cured, produces a good sponge-type cell structure. Either of the components, e.g. Emcol H–77 or cobalt naphthenate or oleate, when employed by itself in the mixture does not produce the desired structure. (Where solubility in the polyester-diisocyanate mixture is not exceeded.)

While the use of cationic and non-ionic detergents which are of limited efficiency as wetting or emulsifying agents are included in the preparation of the sponges of the present invention, the anionic types are usually much more efficient and in general, are preferred.

One of the more general of the methods of preparing sponges comprises mixing a polyester with a diisocyanate, a catalyst, water or water releasing agent, a highly effective emulsifying agent for the polyester-diisocyanate mixture and a powdered detergent material which usually is relatively insoluble in the polyester-diisocyanate mixture, above referred to.

Detergents suitable for use in the process comprise the well known household type, such as the one sold under the trade name of Tide. This is understood to be an anionic detergent and is an alkali metal salt of an organic sulfonate. This powdered detergent may be replaced by other powdered commercial household-type detergents of similar type, such as Dreft. Other solid or powdery materials or detergents which tend to reduce efficiency of an efficient emulsifier and thus produce sponge structures of dual cell sizes comprise such commercial products as Nacconol NRSF which is understood to be an anionic alkyl-aryl sulfonate or a sodium salt thereof; and Igepon T–77 which is understood to be a sodium salt of N-methyl-oleoyltaurate.

It is to be understood that these solid emulsifying agents can often be used as water solutions without added emulsifying agents. Their efficiency is such that the desired sponge structure is directly obtained.

It has also been found that certain of the sudsing household detergents and notably those of liquid type, such as Joy or Lux, are but slightly soluble in organic components of the foam and are adapted to produce good dual cell structure desirable in an artificial sponge and embodying large cells in a foam of minute cells which constitute the walls of the larger cells, without the inclusion of powdered detergent. The liquid detergents adapted to produce sponge structure in the foaming of the synthetic resins in accordance with the provisions of the present invention appear to be good emulsifiers in water and having but poor emulsifying powers in the polyester-diisocyanate mixture. These liquid detergents often contain substantial amounts of water and they may supply all of the water required to produce cellulation of the polyester-diisocyanate mixture. In other instances, it may be desirable to add a small quantity of water in order to supplement the action of the water in the liquid detergent. These liquid detergents seemingly are somewhat intermediate in their emulsifying character being capable of producing sufficient emulsification of the poly-ester-diisocyanate mixture to attain the dual cellular or sponge structure involving large bubbles comparatively uniformly distributed in a foam of fine bubbles. However, they do not possess such good emulsifying characteristics for the poly-ester-diisocyanate-water mixture as is required to produce the well known fine celled foams. The active components of the detergents or emulsifying agents of this invention are most usually water soluble, organic sulfonic acids or organic sulfates, or water soluble salts thereof with bases such as sodium or potassium hydroxides, ammonia, or amines.

Examples of these agents are: the ammonium salt of the oleic acid; amide of methyl taurene; the sodium salt of lauryl sulfoacetic acid; the potassium salts of higher alkylated benzene sulfonic acids where the alkyl groups are predominantly about 12 carbon atoms in length; ethers of higher fatty alcohols containing about 8 to 18 carbon atoms and lower hydroxy-alkyl sulfonic acids, e.g. the lauryl ether of 1,3-dihydroxy propane-3-sodium sulfonate; and the sodium salts of the sulfuric acid, esters of coconut oil monoglycerides.

Any of these may be modified, if desired, with various agents such as amides of higher fatty acids and ammonia or primary or secondary amines. The amides are of the formula:

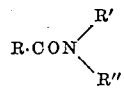

where R is alkyl of 10 to 14 carbon atoms in length, R' and R" are hydrogen or alkyl of 1 to 4 carbon atoms in length and the sum of carbons in R' and R" being 5 or less. The sulfonates or sulfates may also be modified with sodium salts of tripolyphosphate or other modifiers.

The commercial detergent, Tide, is understood to be manufactured by such processes as are disclosed in such U.S. patents as:

| | |
|---|---|
| 2,264,737 | 2,396,278 |
| 2,383,737 | 2,486,921 |
| 2,383,738 | 2,486,922 |

Joy is manufactured by the process disclosed in U.S. Patent 2,383,737 or one similar thereto.

The capacity of a particular emulsifying agent for producing sponge structures of a cellulatable mixture, said structure comprising a mass of large cells in a foam of small cells, can easily be ascertained by checking the solubility of the agent in the polyesters. Those having only slight solubility readily produce sponge structure even with small amounts of emulsifying agent. Many others of higher solubility in the polyester can be made to produce sponges by adding more of the agent or by adding agents designed to reduce their powers as herein disclosed.

In the preparation of artificial sponges in accordance with the provisions of the present invention, various plastic materials may be employed, but a strong preference is to be expressed for those containing free hydroxyls adapted to be cross-linked by the diisocyanate and which are also liquid materials at the temperatures employed in mixing and curing the several constituents of the sponge. Among the various plastic materials, none have been found to be more satisfactory than those from polyesters of dibasic acids free of ethylenic groups and alcohols containing a plurality of hydroxyls in the alcohol molecule. Preferably the alcoholic component of the polyesters comprises a major portion of a dihydric alcohol such as ethylene glycol, diethylene glycol, propylene glycol, or dipropylene glycol, or trimethylene glycol, polyethylene glycol, 1,3-butylene glycol, 1,4-butylene glycol or the like.

It is usually preferred to include in the mixture a minor proportion of a polyhldric alcohol such as glycerol, triethylol methane, trimethylol propane, pentaerythritol, mannitol or the like containing three or more hydroxyls. Preferably the sum of the hydroxyls available in the mixture from which the polyester is formed is in excess over the carboxyl groups.

The polyhydroxy alcohol component provides available hydroxyls at intervals along the polyester chain adapted to be cross-linked by the diisocyanate with corresponding groups in contiguous molecules thus to produce thermosetting of the polyester.

It is to be recognized that free carboxyls are often present in the polyester. These can also react with the diisocyanate to give amide linkage and also to generate carbon dioxide gas. This reaction is usually minor, since but few carboxyls are present.

In the preparation of polyesters, various dibasic acids or the anhydrides thereof may be employed but emphasis is to be placed upon the use at least of a major proportion a saturated acyclic dicarboxylic acid such as adipic acid, succinic acid, sebacic acid, azelaic acid, or the like. These may be supplemented by or replaced by aromatic dicarboxylic acids such as phthalic acid (or anhydrides thereof,) terephthalic acid, isophthalic acid or others. Polyesters containing up to equal moles of the two types of acids are preferred.

The diisocyanates of the sponge producing mixture comprise the various diisocyanates adapted to react by esterification to cross-link the polyester molecules and to produce gases which are entrapped in the mixture. The following are examples:

TABLE A

Chlorophenyl 2,4-diisocyanate
Ethylene diisocyanate
1,4-tetramethylene diisocyanate
p-Phenylene diisocyanate
Tolylene diisocyanate (mixed isomers)
p,p'-Diisocyanato diphenylmethane
Hexamethylene diisocyanate, and others The tolylene diisocyanate mixed isomers, however, are presently preferred, though of course, this preference is subject to change dependent upon commercial availability of the various diisocyanates and such like factors.

The use of water to react with a part of the diisocyanate in order to form gas has already been referred to. For this purpose water, by itself, may be employed by appropriately mixing it with the polyester-diisocyanate composition. However, for smoothness of reaction, it is often preferable to incorporate the water in latent state as for example by the addition of a hydrated salt such as magnesium sulfate heptahydrate; still another hydrated salt which is often preferred for the purpose comprises the trihydrate of sodium acetate.

Appropriate catalysts of the reaction comprise tertiary amines such as the morpholines and being represented by N-methyl morpholine, trimethyl amine and others.

A generalized formulation of a composition suitable for use in forming sponges is:

| | Parts by weight |
|---|---|
| Polyester[1] | 100 |
| Emulsifier | 1–10 |
| $H_2O$ | 1–4 |
| Catalyst | 1–2 |
| Diisocyanate | 20–35 |
| Emulsifier activity control agent [2] | 0–20 |

[1] The polyester is preferably of an acid number of 1 to 15, e.g. 2 to 5; a viscosity on the Gardner-Holdt scale at 100 percent solids of $Z_1$–$Z_9$, e.g. $Z_3$–$Z_5$.
[2] The emulsifier activity control agent in some instances may be omitted, but in those instances where the emulsifier is highly efficient, it may be necessary, if large cells uniformly distributed in a foam of small cells is to be attained.

It is to be recognized that the reactions to form gases will proceed at normal room temperature, but the reaction is exothermic in nature. It can also, if desired, be promoted by the application of mild heat. When such a mixture reacts, the diisocyanate in part decomposes owing to the action of water, to form the gas for foaming the mixture. A strong cross-linking action also occurs between the diisocyanate molecules and the hydroxyls of the polyester, thus changing the polyester into a polyurethane in solid, insoluble state before the bubbles of gas can escape.

It often is desirable to heat the foamed mixture to effect completion of the cross-linking reaction. A temperature of about 100° C. to 200° C. for a period of about 10 minutes to 2 hours is satisfactory. A good range is at 104° C. to 150° C. for about 30 minutes.

It is a characteristic of the plastic sponges of this invention that in addition to embodying a desired cell structure of large, relatively uniformly distributed bubbles comparatively closely packed in a foam of quite small cells, that the plastic materials embodying the cell wall may contain a synthetic detergent (liquid or pulverulent) embedded in, or otherwise dispersed in the plastic. These detergent materials in spite of the presence of the plastic material in or around them, are still water dispersible. A sponge of such type when appropriately wet with water will produce cleansing suds in adequate quantity over a considerable period of time. The sponge therefore may be used for washing many articles such as dishes, automobiles, walls, and the like, for some time without any application of soap or detergent in conventional manner. The pulverulent detergents actually incorporated in the resin material during the curing operation is dissolved out comparatively slowly. When the pulverulent detergent is finally exhausted, the cell structure is still retained. The artificial sponges even after the detergent is removed or substantially removed therefrom, can still be employed in washing operations of many types with or without the application of detergents in conventional manner.

The following examples are illustrative of the preparation of synthetic sponges in accordance with the provisions of the present invention:

*Example I*

In this and subsequent examples, an alkyd resin was prepared comprising:

| | |
|---|---|
| Adipic acid | 16 moles. |
| Diethylene glycol | 18 moles. |
| Glycerine | 1 mole. |
| Catalyst (toluenesulfonic acid) | 0.1 percent based upon the mixture. |

This mixture was reacted in accordance with the conventional procedures to form a resin having a hydroxyl value in a range of 60 to 80 and an acid number of 2 or less.

The foregoing polyester in liquid form and in an amount of 11.15 parts by weight was incorporated with 6 parts by weight of sodium acetate trihydrate (a water supplying agent). An odor-masking agent, namely, methyl salicylate in an amount of 0.67 part by weight was added; also a small amount of a pink dye sometimes desirable from the standpoint of color rather than function was added as a 5 percent solution in styrene.

This composition in an amount of 12.6 parts by weight was mixed with 62.5 parts by weight of the polyester as first described, 3.25 parts by weight of a commercial sudsing detergent (Joy), .035 part by weight of N-methylmorpholine as a catalyst of reaction, and 21.3 parts by weight of a commercial mixture of tolylene diisocyanates sold by the Du Pont Company.

The several ingredients were thoroughly mixed and were then cured in a container but with a free surface, at a temperature of about 220° F. to provide a flexible, highly porous, sponge structure of large bubbles well distributed in a foam of small bubbles. The product was excellently adapted for use as a washing sponge which contained the sudsing detergent actually incorporated into the resin. The sponge could be dipped in water and used as a scrubbing agent for cleaning dishes, woodwork, automobiles, and the like. A sponge of this, or closely analogous structure was found to have a relatively long life as a cleaning agent containing its own foaming detergent.

It is a characteristic of the sponge that after the detergent is exhausted from the cell walls it is still valuable for use as a conventional sponge to which foam-producing detergents and soaps can be applied in the conventional manner.

Example II

In accordance with this example, a foamable composition was prepared comprising:

| | Grams |
|---|---|
| Polyester (per Example I) | 100 |
| Toluene diisocyanate (mixed isomers) | 25 |
| Joy (liquid detergent) | 4.6 |
| N-methylmorpholine | 3 |

The Joy mentioned in the formation is a household-type, foaming detergent available at any grocery store. It is an inefficient emulsifier in the system and does not dissolve well in the polyester. This detergent contains a considerable amount of water and when it is added to the above mixture, it reacts with the toluene diisocyanate to liberate carbon dioxide. The foregoing foamed mixture was cured for 30 minutes at 220° F. to provide a flexible, highly sponge-like body of large cells in a foam of small cells. It could be dipped in water and used to generate suds and also to act as a scrubbing body for cleaning dishes, woodwork, automobiles and other articles too numerous to mention.

Example III

In accordance with this example, 200 grams of the polyester resin mentioned in Example I was mixed with 50 grams of tolylene diisocyanate, 6.3 grams of liquid sudsing detergent (Joy), 4 grams of N-methylmorpholine (catalyst) and 4.6 grams of water. This mixture was cured for 30 minutes at 220° F. to provide a flexible sponge of rather coarse cell structure which could be dipped in water and used as a combined scrubbing and sudsing body.

Example IV

Two hundred grams of liquid polyester which was the same as that described in Example I was mixed with 50 parts by weight of tolylene diisocyanate (mixed isomers) and 4 parts by weight of Emcol H-77. This is a commercial detergent of the anionic type and is understood to contain a polyalcohol, a carboxylic acid ester and a sulfonated glyceride as an alkali metal salt. It appears to be soluble in and a good emulsifying agent for the components of the sponge composition and is a poor sudsing agent in water. To the mixture was also added 25 parts by weight of Tide, a household detergent of powder form which is of good solubility in and is a good sudsing agent with water. Water in an amount of 6 parts by weight and 4 parts by weight of a catalyst (N-methylmorpholine) were also added. This mixture was cured for 30 minutes at 220° F. to provide a good flexible resin sponge of desired structure which when dipped in water provided a valuable scrubbing agent that liberated suds as required in the cleaning of various surfaces.

Example V

In this example, a chloride salt of a quaternary ammonium compound sold commercially as Arquad 2-C and which is cationic was employed as an emulsifying agent. This material when incorporated into a foamable mixture of polyester and diisocyanate without added agents to reduce its efficiency as an emulsifier, does not produce a sponge structure. However, when a detergent such as Tide (powdery household detergent) is present in excess in the mixture good sponge structures involving uniformly distributed large bubbles in a foam of smaller bubbles can be obtained. A mixture of the following composition was prepared:

| | Parts by weight |
|---|---|
| Polyester resin (Example I) | 100 |
| Tide | 12.5 |
| Arquad 2-C | 1 |
| Water | 3 |
| Catalyst (N-methylmorpholine) | 2 |
| Tolylene diisocyanate mixed isomers | 25 |

The Tide was in excess of the amount that would dissolve. The mixture was allowed to foam and was cured for 30 minutes at 220° F. to provide a good sponge structure involving large bubbles, as represented in the drawings, relatively uniformly distributed in a fine foam of small bubbles. This sponge could be dipped in water to provide a sudsing body adapted for scrubbing purposes without added detergent. After the detergent (Tide) was exhausted from a body the latter could be employed in conventional manner for scrubbing.

In a corresponding foamable mixture from which the Tide is omitted, sponge structure is not obtained.

Example VI

In accordance with the provisions of this example, a mixture was prepared as in Example V except that the Arquad 2-C was replaced by 2 parts by weight of styrene. The mixture was allowed to foam and was cured as in Example V. The product was a good sponge structure which could be wet with water and employed as a combined sudsing and scrubbing agent. The sudsing agent (Tide) in such a member will withstand considerable use before it is exhausted. When, however, it becomes depleted the member may be treated in conventional manner with soap or a detergent and employed for scrubbing operations for a long period of time.

Example VII

In this example, Tide was employed as the sole emulsifying agent in the sponge producing mixture. The amount thereof was again deemed to be much in excess of that which could be dissolved in the mixture in a conventional foaming operation. The foamable mixture was of the following composition:

| | Parts by weight |
|---|---|
| Polyester resin | 100 |
| Tide | 12.5 |
| Water | 3 |
| Catalyst (N-methylmorpholine) | 2 |
| Tolylene diisocyanate mixed isomers | 25 |

The mixture was allowed to foam and was cured for 30 minutes at 220° F. to provide a good sponge body containing detergent (Tide) incorporated into the plastic material in such manner that the sponge body would produce suds when the body was filled with water and could therefore be used for scrubbing without added soaps or detergents.

Example VIII

In accordance with the provisions of this example, a commercial emulsifier (Emcol H-77) was employed in combination with an agent (cobalt naphthenate) designed to decrease the surfactant properties of the emulsifier. The sponge forming mixture was of the following composition:

| | Parts by weight |
|---|---|
| Polyester resin | 100 |
| Emcol H-77 | 2 |
| Cobalt naphthenate | 1.5 |
| Water | 2.5 |
| N-methylmorpholine | 2 |
| Tolylene diisocyanate mixed isomers | 30 |

This mixture was allowed to foam and was cured at 220° F. for 30 minutes to provide a good sponge body which although it lacked the sudsing properties of those previously described, was still capable of use with soaps and detergents in conventional manner in scrubbing various articles.

For purposes of comparison, a foamable composition comprising Emcol H-77 as an emulsifier, but without the use of the activity control agent, was prepared as follows:

| | Parts by weight |
|---|---|
| Polyester resin | 100 |
| Emcol H-77 | 2 |
| Water | 2 |
| N-methylmorpholine | 2 |
| Tolylene diisocyanate mixed isomers | 25 |

The mixture was allowed to foam and was cured at 220° F. for 30 minutes.

The resultant body was composed of small cells exclusively or substantially exclusively, and was not suitable for use as a sponge.

*Example IX*

It has been found that some of the emulsifying agents, which when used in small quantities in a foamable polyester-diisocyanate mixture, result in foams composed substantially entirely of small bubbles, can be employed in large amounts to provide sponge structures embodying large bubbles in a foam of small bubbles.

The composition of this example is as follows:

| | Parts by weight |
|---|---|
| Polyester resin | 100 |
| Water | 2.5 |
| N-methylmorpholine | 2 |
| Arquad 2-C | 5 |
| Tolylene diisocyanate mixed isomers | 30 |

It was deemed that the emulsifying agent (Arquad 2-C) in the foregoing mixture was present in such amount as to satisfy the requirements for an emulsifying agent and to leave a substantial excess of emulsifier in the system. The foregoing mixture was allowed to foam and was cured for 30 minutes at 220° F. The product was a sponge structure of large bubbles distributed in a foam of small bubbles. However, the structure was deemed to be definitely less desirable than those described in the preceding examples, as for instance in Example V. Since the product does have a definite sponge structure, it is included for purposes of illustration in the present specification.

*Example X*

In this example Triton X-200, which is understood to be a sodium salt of an alkylaryl polyether sulfonate containing 28 percent of active material, was employed. The sponge forming mixture was of the following composition:

| | Parts by weight |
|---|---|
| Polyester resin (per Example I) | 100 |
| Triton X-200 | 2 |
| Water | 1.1 |
| N-methylmorpholine | 2 |
| Tolylene diisocyanate mixed isomers | 30 |

The mixture was allowed to foam and was cured for 30 minutes at 220° F. to provide a sponge comprising large bubbles relatively uniformly mixed in a foam of small bubbles and being well adapted for use as a sponge in various scrubbing operations.

*Example XI*

In this example, Igepon T-77 as a 10 percent water solution was employed as an emulsifying agent. In such capacity, it is of low efficiency possibly because of low solubility. Its use as an emulsifier in a foamable mixture results in a good sponge structure. The foamable composition was as follows:

| | Parts by weight |
|---|---|
| Polyester resin | 100 |
| Water | 2 |
| 10 percent solution Igepon T-77 | 2 |
| N-methylmorpholine catalyst | 2 |
| Tolylene diisocyanate mixed isomers | 30 |

The mixture was allowed to foam and was cured at 220° F. for 30 minutes to provide a good sponge structure adapted for use in scrubbing operations.

*Example XII*

In this example solid flake Nacconol NRSF was employed as an activity control for an active emulsifier, namely Emcol H-77. The sponge forming mixture was of the following composition:

| | Parts by weight |
|---|---|
| Polyester resin | 100 |
| Emcol H-77 | 2 |
| Nacconol NRSF | 9.3 |
| Water | 3 |
| N-methylmorpholine | 2 |
| Tolylene diisocyanate mixed isomers | 25 |

The Nacconol NRSF of this example is a flaked material and is understood to be an alkylaryl sulfonate or a sodium salt thereof. The above mixture was cured at 220° F. for 30 minutes to provide a good sponge structure useful for washing and scrubbing operations.

*Example XIII*

In accordance with this example, Igepon T-77 as a solid material is employed in large amount as a cell size control agent for Emcol H-77 as an emulsifying agent in a sponge forming mixture. The composition was as follows:

| | Parts by weight |
|---|---|
| Polyester resin | 100 |
| Emcol H-77 | 2 |
| Igepon T-77 | 12.5 |
| Water | 3 |
| N-methylmorpholine | 2 |
| Tolylene diisocyanate mixed isomers | 25 |

The mixture was foamed and cured at 220° F. for 30 minutes to provide a good sponge structure.

It will be appreciated that the sponges as illustrated in the foregoing examples are of good mechanical strength and will successfully withstand wringing or other forces without tearing. Likewise, they are quite resistant to abrasion such as is encountered in conventional scrubbing operations and may therefore be employed in scrubbing operations over long periods of time without substantial wear. It is also a characteristic of these sponges that they are resistant to chemical agencies such as dilute acids and alkalies as well as many of the solvents. They are also resistant, to a considerable degree, to hydration by water employed in the various scrubbing operations, even in the presence of soaps and detergents often employed with water in such operations.

In the examples, it is to be understood that various polyester bodies especially those embodying non-ethylenic dicarboxylic acids and dihydric alcohol-polyhydric alcohol mixtures may be substituted for that of Example I. For example, it will be appreciated that in the polyesters of the example, such acids as succinic acid or azaleic acid may be substituted in part or entirely for adipic acid. The adipic acid or the isocyclic substituents, therefore, may be replaced by phthalic acid.

In the examples, the tolylene diisocyanate mixed isomers may be replaced by any one or a mixture of the diisocyanates listed in Table A.

Diethylene glycol in the polyester may be replaced by dipropylene glycol or any of the other glycols herein enumerated.

It would appear that the formation of a sponge structure of well distributed large cells in a foam of small cells in the polyester-diisocyanate polymer with many emulsifying agents is due in part, if not entirely, to the presence of excess of emulsifying agent beyond the amount required to produce optimum fine cell structure. This fact is well illustrated by experiments in which the percentage of Arquad 2-C was increased to 5 parts per 100 parts of resin. A large cell structure in a base of small cells is thus produced. With 2 parts of Arquad 2-C, the cell structure consists essentially of small bubbles none of which dominate over the others.

Similarly, if the percentage of Emcol H-77 is increased to 7 parts per 100 parts of resin, a sponge structure of dominant large cells in a base of small cells results; with 2 parts of the Emcol H-77 per 100 parts of polyester, the cell structure consists essentially of small cells with few, if any, dominant large cells.

On the other hand, where Joy, a conventional household detergent is used in an amount of about 2 or 3 parts per 100 parts of polyester, a sponge of dominant large cells in a foamy mass of small cells results. If the proportion of Joy is reduced to about ½ part per 100 parts of resin, the resultant product is a foam with but very little cell enlargement.

In those instances where a powdery detergent such as Tide is employed as in many of the examples of this application, the excess of detergent is so great that only a part thereof is assimilated in the system. This may also be true where liquid emulsifiers and detergents are employed; as for instance, if the proportion of Emcol H-77 is increased to 7 parts per 100 parts of polyester, the mixture assumes a cloudiness, indicating incompatibility. The present application however, does not depend upon any specific explanation of the mode of operation.

Particular emphasis has been placed upon the production of soft flexible sponge structures suitable for washing operations. If desired, similar techniques could be employed to form rigid cellular bodies comprising large cells relatively uniformly distributed in rigid foam of small cells.

It will be apparent to those skilled in the art that the several embodiments of the invention as herein given are by way of illustration. Manifestly numerous modifications may be made therein without departure from the spirit of the invention or the scope of the appended claims.

We claim:

1. As an article of manufacture, a flexible synthetic sponge suitable for use in washing solid surfaces and being a foam of polyurethane resin and comprising (A) a resinous polymer of a polyester of a polyhydric alcohol and a dicarboxylic acid, said polyester containing available hydroxyls, and (B) organic diisocyanate, said foam comprising a mass of large, intercommunicating, bubble-like cells of a diameter which is substantially greater than 0.05 inch, but not substantially greater than about one-half inch in a foam of cells of a diameter not substantially greater than 0.05 inch, the latter cells providing the walls separating the cavities of the large cells, said synthetic sponge further containing a water-soluble, organic, sulfonic, pulverulent synthetic detergent in an amount of about 9.3 to about 12.5 percent by weight based upon the polyester.

2. As an article of manufacture, a flexible synthetic sponge suitable for use in washing solid surfaces and being a foam of polyurethane resin and comprising (A) a resinous polymer of a polyester of a polyhydric alcohol and a dicarboxylic acid, said polyester containing available hydroxyls, and (B) tolylene diisocyanate, said foam comprising a mass of large, intercommunicating, bubble-like cells of a diameter of about one-half inch in a foam of cells of a diameter not substantially greater than 0.05 inch, the latter cells providing the walls separating the cavities of the large cells, said synthetic sponge further containing a water-soluble, organic, sulfonic, pulverulent synthetic detergent in an amount of about 9.3 to about 12.5 percent by weight based upon the polyester.

3. As an article of manufacture, a soft, flexible synthetic sponge suitable for use in washing surfaces and comprising a soft, flexible foam of polyurethane resin, said resin being formed by reaction of (A) 100 parts by weight of a polyester of a hydroxyl value of about 60-80, said polyester being formed by the reaction of (1) a mixture of polyhydric alcohols, the major portion of which is an alcohol selected from the class consisting of ethylene glycol, diethylene glycol, propylene glycol, dipropylene glycol, 1,3-butylene glycol, 1,4-butylene glycol, a minor amount of the mixture of polyhydric alcohols being selected from the class consisting of glycerol, triethylolmethane, trimethylolpropane, pentaerythritol and mannitol, and (2) a dicarboxylic acid selected from the class consisting of adipic acid, succinic acid, sebacic acid, azelaic acid, phthalic acid, terephthalic acid and isophthalic acid, (B) about 20 to about 35 parts by weight of toluene diisocyanate, (C) about 1 to about 4 parts by weight of water, and (D) a detergent dispersed in the plastic and being selected from a class consisting of alkyl-aryl sulfonic acids and sodium salts, potassium salts and ammonium salts of said acids, said detergent being present in an amount of about 1 to 12 percent by weight based upon the polyester and in an amount in excess of that which will dissolve in the polyester, the major portion of said foam comprising a mass of relatively large, intercommunicating, bubble-like cells of a diameter which is substantially greater than 0.05 inch, but not substantially greater than about ½ inch and being uniformly distributed in a foam of cells of a diameter not essentially greater than 0.05 inch, the latter cells providing walls separating the larger cells from each other, said cells being adapted to take up water when the soft sponge is squeezed and released in water.

4. The method of forming a soft, flexible synthetic sponge useful for washing solid surfaces, which comprises forming and foaming a mixture comprising a polyester of a hydroxyl number of about 60 to about 80, 100 parts by weight; toluene diisocyanate, 20-35 parts by weight; water, 1-4 parts by weight; and tertiary amine catalyst, 1-2 parts by weight, the mixture further containing a substantially completely dissolved emulsifier and a salt selected from the class consisting of cobalt linoleate, cobalt oleate, nickel naphthenate, manganese naphthenate and cobalt naphthenate to effect formation in the mixture of relatively large cells of a diameter which is substantially greater than 0.05 inch, but not substantially greater than ½ inch and being uniformly distributed in the foam, the walls of the large cells being formed of minute bubbles of a diameter of about 0.05 inch, the cells of the foam being intercommunicating and being adapted to take up water and release water when the sponge is squeezed and released by the user, said polyester being a reaction product of a mixture of (1) a dicarboxylic acid selected from the class consisting of adipic acid, succinic acid, sebacic acid, azelaic acid, phthalic acid, terephthalic acid and isophthalic acid, and (2) a mixture of a major amount of a dihydric alcohol selected from the class consisting of ethylene glycol, diethylene glycol, propylene glycol, dipropylene glycol, 1,3-butylene glycol and 1,4-butylene glycol, and a minor amount of a polyhydric alcohol selected from the class consisting of glycerol, triethylol methane, trimethylol propane, pentaerythritol and mannitol.

References Cited in the file of this patent

UNITED STATES PATENTS

| | | |
|---|---|---|
| 2,374,136 | Rothrock | Apr. 17, 1945 |
| 2,466,826 | Romaine | Apr. 12, 1949 |
| 2,577,279 | Simon et al. | Dec. 4, 1951 |
| 2,577,280 | Simon et al. | Dec. 4, 1951 |
| 2,846,408 | Brochhagen et al. | Aug. 5, 1958 |
| 2,866,762 | Brochhagen et al. | Dec. 30, 1958 |

FOREIGN PATENTS

| | | |
|---|---|---|
| 1,050,550 | France | Sept. 2, 1953 |
| 516,512 | Belgium | Jan. 15, 1953 |
| 519,546 | Belgium | May 15, 1953 |
| 480,713 | Italy | May 12, 1953 |